US008969766B2

(12) United States Patent
McGaugh (10) Patent No.: US 8,969,766 B2
(45) Date of Patent: Mar. 3, 2015

(54) SYSTEMS AND METHODS FOR CONTROLLING AN ADAPTIVE HEATING SYSTEM WITH EXCHANGEABLE HEAT SOURCES

(76) Inventor: Larry McGaugh, Bothell, WA (US)

(*) Notice: Subject to any disclaimer, the term of this patent is extended or adjusted under 35 U.S.C. 154(b) by 672 days.

(21) Appl. No.: 12/833,005

(22) Filed: Jul. 9, 2010

(65) Prior Publication Data

US 2011/0240623 A1    Oct. 6, 2011

Related U.S. Application Data

(60) Provisional application No. 61/321,120, filed on Apr. 5, 2010.

(51) Int. Cl.
*B60L 1/02* (2006.01)
*H05B 1/02* (2006.01)
*F24H 3/04* (2006.01)

(52) U.S. Cl.
CPC . *H05B 1/028* (2013.01); *B60L 1/02* (2013.01); *F24H 3/0429* (2013.01); *F24H 3/0441* (2013.01)
USPC .......................................... 219/202; 392/307

(58) Field of Classification Search
None
See application file for complete search history.

(56) References Cited

U.S. PATENT DOCUMENTS

| | | | | |
|---|---|---|---|---|
| 3,855,814 A * | 12/1974 | Eubank | | 62/244 |
| 4,971,136 A * | 11/1990 | Mathur et al. | | 165/240 |
| 5,960,157 A * | 9/1999 | McGraw | | 392/308 |
| 6,688,678 B2 * | 2/2004 | Crean | | 296/204 |
| 7,284,710 B2 * | 10/2007 | Rixen et al. | | 237/12.3 B |

* cited by examiner

*Primary Examiner* — Jerome Jackson, Jr.

(57) ABSTRACT

An adaptive heating system for optimizing energy resources while heating a confined area. The adaptive heating system includes at least the following components: a controller, a first heat source, a switch device, and a wireline system. The wireline system is configured to connect the controller to the first heat source, a second heat source, and the switch device. The controller is configured to receive an input from the switch device, determine whether the input indicates a selection of the first heat source or a selection of the second heat source, and then initiate operation of either the first or the second heat source, based on the determined selection. The first heat source is associated with an electric heater and the second heat source is associated with a gas furnace.

20 Claims, 7 Drawing Sheets

SYSTEMS AND METHODS FOR CONTROLLING AN ADAPTIVE HEATING SYSTEM WITH EXCHANGEABLE HEAT SOURCES

CROSS REFERENCE TO RELATED APPLICATIONS

The present application claims the benefit of U.S. Provisional Patent Application No. 61/321,120, filed Apr. 5, 2010, which is fully incorporated herein by reference.

FIELD OF THE INVENTION

The field of the present invention generally relates to systems and methods for heating confined areas using multiple, exchangeable heat sources. Specifically, heat source selection for the exchangeable heat sources can be made by a user wishing to optimize temperature stability in a confined area and/or to conserve limited energy resources based on environmental conditions and energy resource availability.

BACKGROUND OF THE INVENTION

At present, the standard for heating a mobile residence, including recreational vehicles, busses, vans, travel trailers, fifth wheelers, mobile homes, aircraft, watercraft, and the like, has been to use liquefied petroleum gas (LPG) as a single, primary heat source. As would be understood by those skilled in the Art, LPG is a flammable mixture of hydrocarbon gases commonly used as a fuel in heating certain appliances (e.g., a gas water heater or a gas stove) and confined areas within a mobile residence. Common varieties of LPG may include mixes that are primarily propane or butane based. These fuel sources can consist of solely butane or solely propane, or more commonly, mixes having both propane (C3H8) and butane (C4H10), depending on the season and the particular vendor of the LPG mix. As would be understood by those skilled in the Art, in the winter months, more propane may be in the mix, and in summer months, more butane may be in the mix.

Although LPG is a low carbon-emitting hydrocarbon fuel that is commonly used to heat mobile residences, there are numerous drawbacks associated with using heat sources operating on this fuel type, as opposed to utilizing other heaters that run on electricity. For example, the cost of LPG is often significantly more expensive than other available heat sources, particularly when an electric power source is readily available as an alternative energy source (e.g., when a shore power source is publically available at an RV park); LPG is flammable and it needs to be properly stored in special tanks that prevent the possibility of a fire or an explosion (i.e., in the event an accident would ignite the LPG within the tank); LPG fuel use results in a toxic carbon monoxide byproduct that can endanger persons residing within a mobile residence if a gas furnace's exhaust fumes were to leak into the confined living area(s) of the mobile residence (e.g., within the cabin of an RV); LPG heating systems require pipes to transfer the gas, and the igniter mechanism of gas furnaces are susceptible to failure due to igniter jets becoming clogged with dust, debris, or spider webs; the tanks this fuel is stored in generally need to be refilled on a semi-regular basis so they do not run out of LPG at inopportune times; and the locations for refueling LPG tanks might not be readily available in certain remote geographic locations where the gas furnaces of mobile residences are routinely utilized.

Further, when using LPG as fuel for a gas furnace that is providing heat to a confined area within a mobile residence, it is not uncommon to have temperatures in that area become too hot or too cold during the operation of the gas heating system. This is so, because furnace based heating and ventilation systems generally operate at very high temperatures and most temperature regulation means (e.g., thermostat devices capable of sensing and adjusting room temperature) often fail to adequately compensate for dramatic temperature changes in a timely manner. Also, because these gas furnace systems run so hot, it generally takes longer for temperatures to cool down in the confined area being heated. This is due to the fact that the heating and ventilation system itself can take a while to cool down.

A corresponding residual heating effect can occur shortly after a gas furnace is turned off, as the system attempts to balance its surface temperatures with a desired room temperature (i.e., the temperature within the confined area of the mobile residence) by radiating retained heat that is essentially remaining thermal energy residing within the metal furnace and ventilation system components and housings. This residual heating effect can negatively impact the temperature control system of a mobile residence and it can also be a source of wasted energy, particularly if a resident air-conditioning system is automatically initiated to combat the unwanted residual heating effects, such as when a preferred temperature, which is lower than a current room temperature, is selected via a resident thermostat device.

Accordingly, although LPG is a viable, relatively clean-burning fuel that is commonly used for heating many mobile residences today, there remains a need to facilitate switching over to a functionally equivalent electric heat source having adequate, distributed heat output capability for a particular mobile residence, whenever feasible. Modern portable electric space heaters generally do not offer adequate, distributed heat output or capacity to properly heat an entire mobile residence. These spot heaters typically have a relatively low power rating and they are not able to be paired with the existing ventilation system of a mobile residence in order to properly facilitate distributing heat to multiple confined areas within a mobile residence or to adequately distribute heat to different portions of the same larger confined area. Further, these portable space heaters can cause a fire hazard when left unattended, due to their feeble construction (e.g., due to their plastic housings and low quality power electronics and wiring) and the fact that they are not configured to be secured within a designated fireproof area or housing within a mobile residence.

Accordingly, it would be beneficial to have improved systems and methods for heating confined areas that could take advantage of a safe efficient electric heat source alternative. It would be desirable if these systems and methods did not solely rely on a single LPG heat source to heat a mobile residence. Further, it would be beneficial if these solutions offered flexibility to the user, such that a user could elect a preferred heat source under varying environmental conditions and in various geographic locations where resource availability might be limited; for example, where a local LPG refill location is not readily available or where an electric power supply is either not present or not accessible. Further, it would also be beneficial to have some levels of automation in these systems, such that heat source selection (between an electric heat source and a gas furnace) could be preprogrammed to facilitate logical automated selection of an appropriate heat source when both gas and electric energy supplies are available. For example, when certain default conditions are detected, heat source selection may be automatically designated by a switch or a controller's onboard logic circuitry (e.g., in an auto-detect mode).

SUMMARY OF THE INVENTION

This summary is provided to introduce (in a simplified form) a selection of concepts that are further described below in the Detailed Description. This summary is not intended to identify key features of the claimed subject matter, nor is it intended to be used as an aid in determining the scope of the claimed subject matter.

In overcoming the above disadvantages associated with modern heating systems and methods associated with controlling these heating systems, the present invention discloses an adaptive heating system for optimizing energy resources while heating a confined area. The adaptive heating system includes a controller, a first heat source, a switch device, and a wireline system connecting the controller to the first heat source, a second heat source, and the switch device. In an embodiment, the controller is configured to receive an input from the switch device, determine whether the input indicates a selection of the first heat source or a selection of the second heat source, and initiate operation of either the first or the second heat source, based on the determined selection.

In accordance with one aspect of the present invention, the second heat source is a gas furnace.

In accordance with another aspect of the present invention, the first heat source further includes an electric heating element.

In accordance with a further aspect of the present invention, the first heat source may include a manifold connector facilitating connectivity to a ducted ventilation system.

In accordance with another aspect of the present invention, the first heat source may include a plenum connector facilitating connectivity to a plenum ventilation system.

In accordance with yet another aspect of the present invention, the controller may be connected to a thermostat device that facilitates temperature control for both the first heat source and the second heat source.

In accordance with a further aspect of the present invention, the controller can be connected to the thermostat device via a conductive path comprising the wireline system and the switch device.

In accordance with another aspect of the present invention, the controller may be connected to a shore power source, such that the first heat source can operate using an external power supply that is not a resident component of the adaptive heating system.

In accordance with yet another aspect of the present invention, the controller may be configured to control a heater fan associated with the second heat source in order to circulate air across the electric heating element of the first heat source.

In accordance with a further aspect of the present invention, is an adaptive heating system for installation in a mobile residence. The adaptive heating system includes a controller, an add-on heater cabinet configured to be joined with a resident heat source and a ventilation system of the mobile residence, a switch device, and a wireline system connecting the controller to the add-on heater cabinet, the resident heat source, and the switch device. In an embodiment, the controller is configured to facilitate selection of an electric heater of the add-on heater cabinet or the resident heat source as a preferred heat source, after receiving an input from the switch device.

In accordance with another aspect of the present invention, the mobile residence is a recreational vehicle and the resident heat source is a gas furnace.

In accordance with yet another aspect of the present invention, the add-on heater cabinet includes a specialized connector that facilitates connectivity to the ventilation system of the mobile residence.

In accordance with a further aspect of the present invention, the controller may be configured to be connected with a thermostat device that facilitates temperature control for both the resident heat source and the electric heater.

In accordance with another aspect of the present invention, the controller may be connected to the thermostat device via a conductive path comprising the wireline system and the switch device.

In accordance with yet another aspect of the present invention, the controller may be configured to be connected to a shore power source, peripheral to the mobile residence, such that the electric heater can operate using an external power supply.

In accordance with a further aspect of the present invention, the controller may be configured to control a fan associated with the resident heat source in order to circulate air through the add-on heater cabinet.

In accordance with yet a further aspect of the present invention, the circulated air is heated by the electric heater of the add-on heater cabinet when the controller designates the electric heater to heat the mobile residence, as opposed to the resident heat source.

In accordance with another aspect of the present invention, is a heat source controller for exchanging heat sources utilized to heat the same confined area at different times. The heat source controller includes a high voltage component adapted to receive power from a shore power source and to supply power to an electric heat source, and a low voltage component adapted to receive a heat source selection input and to control operation of a heater fan. The heat source controller may be configured to receive a heat source selection input from a switch device, determine whether the heat source selection input indicates a selection of the electric heat source or a selection of a second heat source, and initiate operation of either the electric heat source or the second heat source, based on the heat source selection input.

In accordance with another aspect of the present invention, the second heat source is a gas furnace.

In accordance with a further aspect of the present invention, the heat source controller may be configured to receive input from a thermostat device that facilitates temperature control for both the electric heat source and the second heat source.

BRIEF DESCRIPTION OF THE DRAWINGS

Preferred and alternative examples of the present invention are described in detail below by way of example and with reference to the drawings, in which.

DETAILED DESCRIPTION

Figure 1:
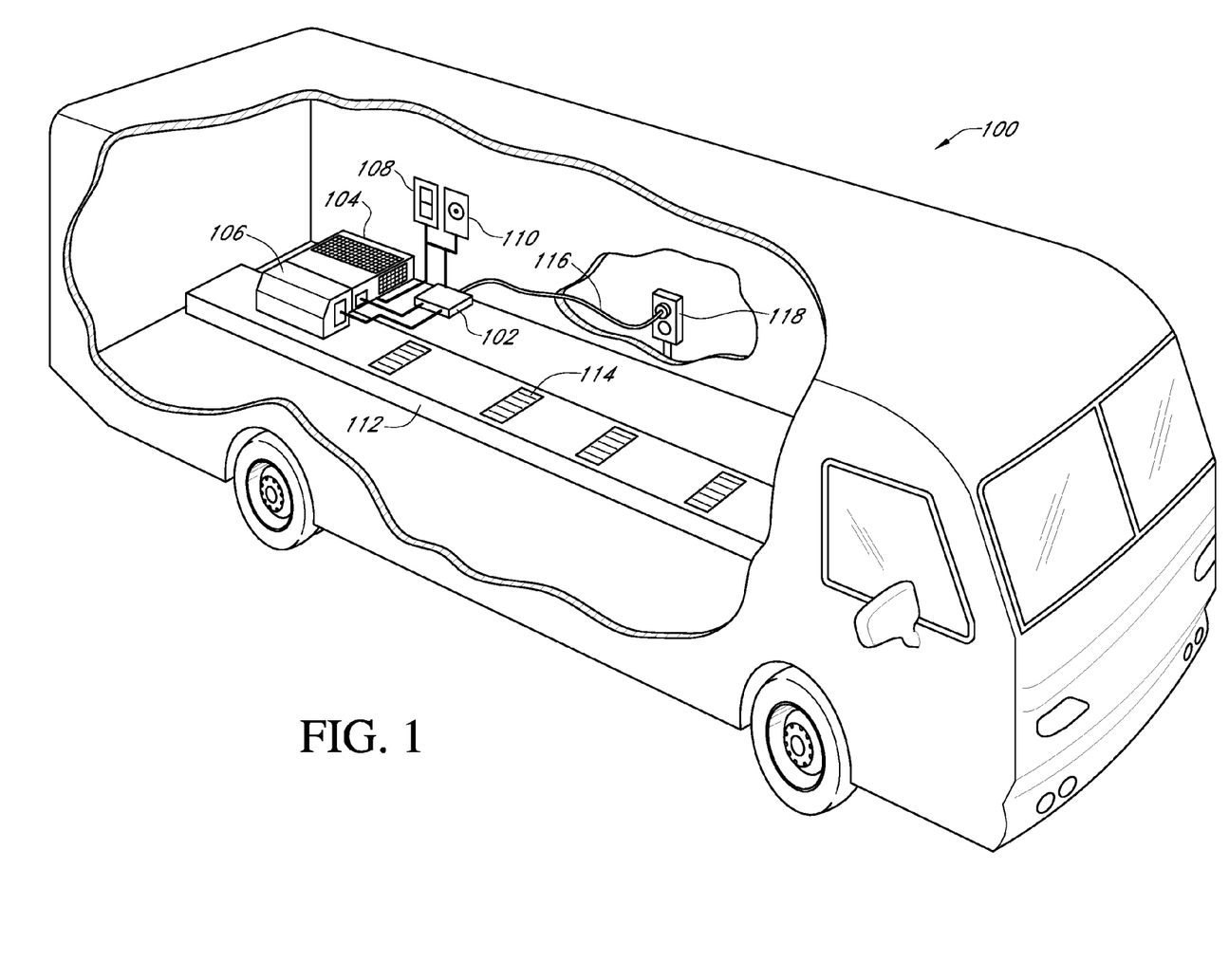
FIG. 1 illustrates a perspective cut-out view depicting an adaptive heating system connected with the ventilation system of a mobile residence, in accordance with an embodiment of the present invention.

In accordance with an exemplary embodiment of the present invention, FIG. 1 illustrates an adaptive heating system connected to the ventilation system of a mobile residence 100. It should be understood that the term "mobile residence" is not limited only to recreational vehicles, as depicted in FIG. 1. Instead, the term mobile residence should be interpreted to include busses, vans, travel trailers, fifth wheelers, mobile homes, aircraft, watercraft, and the like. Any of these mobile residences may be adapted to comprise any of the heating systems and implement any of the methods associated with the present invention. In an embodiment, the mobile residence 100 includes an existing ventilation system 112 having a number of ventilation registers 114 distributed throughout the confined/enclosed area(s) of the mobile residence 100. As used herein, the term "register" generally refers to an adjustable, grill-like device through which heated or conditioned air may be released into a confined area.

As would be understood by those skilled in the Art, ventilation systems in various mobile residences 100 may be different in hardware implementation (e.g., some systems may be plenum based ventilation systems, ducted ventilation systems, or any combination thereof) and ventilation topology (e.g., having various ventilation runs servicing confined areas that are distributed within a particular mobile residence 100). This is so, because the confined area(s) within mobile residences 100 often vary in size, layout, physical obstruction(s), wall insulation quality, etc. Accordingly, it is important to have an adaptive heating system that is truly universal, such that it can be readily added to, or built in to, any mobile residence's 100 heating and ventilation system 112. The systems and methods of the present invention facilitate this functionality by being designed and implemented in such a way as to be compatible with most mobile residence heating and ventilation systems on the market today.

In an embodiment, the primary components of the adaptive heating system depicted in FIG. 1, include, but are not limited to, at least the following components: a controller 102 (also interchangeably referred to herein as: "a heat source controller"), an electric heat source 106, a switch device 108, a resident gas furnace 104, and a resident thermostat device 110. In an embodiment, the controller 102, the electric heat source 106 (e.g., a specialized add-on heater cabinet having an electric heating element embodied therein; See e.g., FIGS. 6A-B), and the switch device 108, may each be added to an existing heating and ventilation system (e.g., a system including a gas furnace 104, a ventilation system 112, and a thermostat device 110) of a mobile residence 100 by:

1. Configuring/installing the add-on electric heat source 106 to be connected with the both the gas furnace 104 and the ventilation system 112 (e.g., as depicted in FIG. 1 and FIG. 4A);
2. Configuring/installing the switch device 108 to be electrically connected with the thermostat device 110 via a wireline system (See e.g., the wireline systems depicted in FIG. 2A and FIG. 3); and
3. Configuring/installing the controller 102 to be electrically connected to each of the electric heat source 106 (e.g., the add-on heater cabinet), the gas furnace 104, the switch device 108, and the thermostat device 110 (e.g., indirectly using the switch device as a bypass), via the wireline system (See e.g., the wireline systems depicted in FIG. 2A and FIG. 3).

Figure 2A:
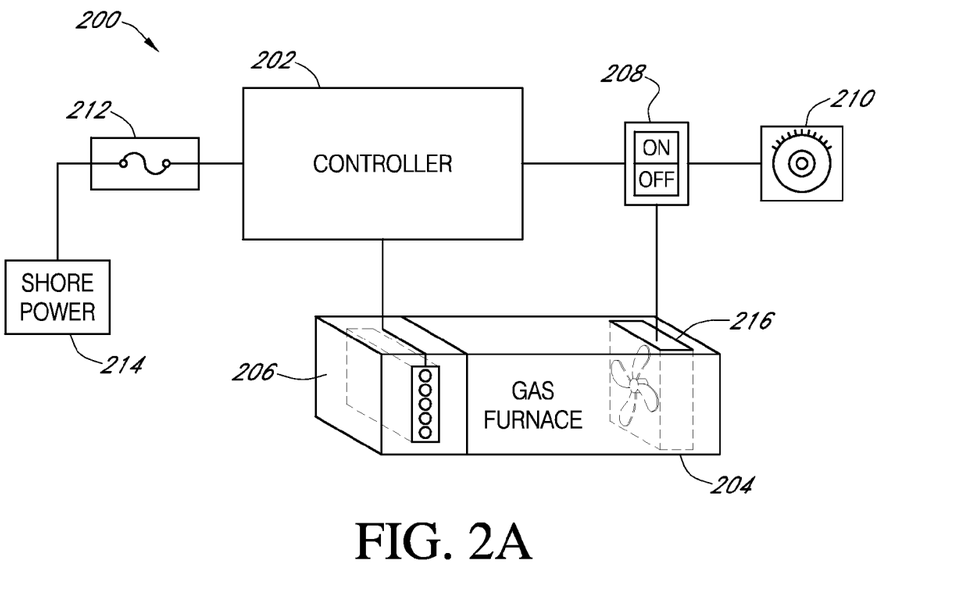
FIG. 2A illustrates a modified block diagram depicting the major components of an adaptive heating system, including an add-on heater cabinet comprising an electric heater, in accordance with an embodiment of the present invention.
Figure 2B:
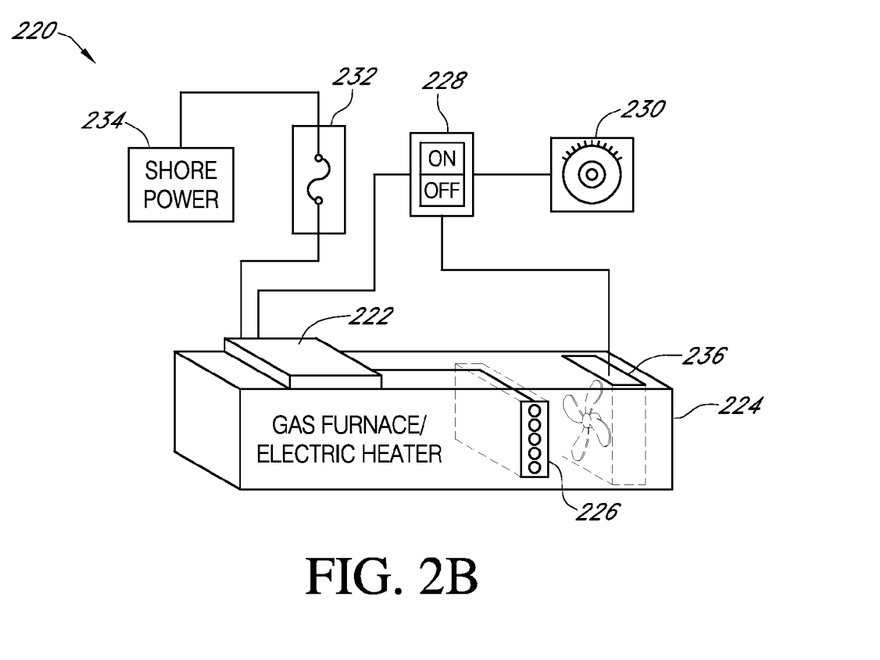
FIG. 2B illustrates a modified block diagram depicting the major components of an adaptive heating system, including a resident electric heater component, in accordance with an embodiment of the present invention.

In another embodiment, the controller 102 and/or the electric heat source 106 may be incorporated into a single heater unit that also includes the gas furnace 104 (See e.g., the adaptive heating system 220 of FIG. 2B). In this embodiment, the single hybrid heater unit (not shown in FIG. 1) and the switch device 108 may be part of an existing adaptive heating and ventilation system (e.g., including the ventilation system 112, the switch device 108, and the thermostat device 110) of a mobile residence 100.

Whether the adaptive heating system of the present invention is an add-on, aftermarket system or part of an integrated, manufacturer-side system, both system configurations may be employed within a mobile residence 100 to achieve substantially similar results. These results include the functionality of allowing for preferred selection of an optimal heat source (e.g., either the electric heat source 106 or the gas furnace heat source 104), when an energy supply is available for each heat source (e.g., availability of a local shore power supply 118, also interchangeably referred to as an "external power supply", and a tank storing an adequate supply of LPG).

In FIG. 1, the LPG tank (not shown) may be co-located near the gas furnace 104 and the electric heat source 106 may be supplied power, indirectly, via the controller 102, which itself may be connected to an external power supply 118 (e.g., a shore power source 118 peripheral to the mobile residence 100) via an electrical power cord 116 that can extend outside of the mobile residence 100. Generally there would be a breaker or fuse device (not shown in FIG. 1) between the external power supply 118 and the controller 102, as discussed further herein. In an embodiment, when both gas and electrical energy resources are available, a user can manually flip the switch device 108 to select either one of the gas furnace 104 or the electric heat source 106 as the operational heat source for the mobile residence 100, at any particular time. In this way, a user can readily exchange heat sources based on either preference or necessity.

In accordance with another embodiment of the present invention, the switch device 108 may be an automatic or a hybrid manual/automatic switch device (not shown) that is capable of instructing the controller 102 to select the electric heat source 106 over the gas furnace 104, whenever connection to an external power supply 118 is detected (or vice-versa whenever an external power supply 118 is disconnected). In other embodiments, it is envisioned that an automatic or a hybrid switch device may detect some other predefined condition and then automatically issue an instruction to the controller 102 to switch over to one of the electric heat source 106 or the gas furnace 104, depending on whether or not a condition threshold was reached or exceeded.

For example, a condition threshold may be related to a level of remaining LPG in the LGP tank on board the mobile residence 100. In a scenario where the LPG level drops below a predefined LPG threshold (this may be detectable by a sensor connected with the LPG tank), the automatic or hybrid switch device may automatically instruct the controller 102 to switch over to the electric heat source 106. In another scenario, the automatic or hybrid switch device may only inform the controller 102 that the condition threshold has been reached or exceeded. In this scenario, the controller 102 may itself determine to automatically switch over to the electric heat source 106 or the gas furnace 104 after receiving only an indication that a condition threshold was reached or exceeded (e.g., an indication of whether or not an electric power supply 118 is presently available). Other conditional thresholds that may initiate an automatic switch between heat sources 104 and 106 may relate to a temperature level within a confined area, a surface temperature associated with the surface of any of heating and ventilation system components, an outside temperature, or any other common condition that may influence or necessitate a change between the gas furnace 104 and the electric heat source 106 as a primary heat source.

FIG. 2A illustrates a modified block diagram 200 depicting the major components of an adaptive heating system 200, including an add-on heater cabinet 206 comprising an electric heating element, in accordance with an embodiment of the present invention. It should be understood that the adaptive heating system 200 is a simplified block diagram showing connectivity only between major system components. Other connections and system components could be added to the heating system 200 without departing from the spirit and scope of the present invention. In an embodiment, the adaptive heating system 200 includes at least the following components: a controller 202; a gas furnace 204 having an internal fan 216 for circulating air through the gas furnace 204; an electric heat source 206 that may be an add-on heater cabinet comprising and electric heating element (See e.g., FIGS. 6A-B); a switch device 208 that facilitates selection of either the electric heat source 206 or the gas furnace 204 as a preferred heat source; a thermostat device 210 that can be utilized by the controller 202 to control the heat output levels for either the electric heat source 206 or the gas furnace 204, depending on a heat source selection; a shore power source 214 that can provide electric power to the controller 202, which in turn provides power to the electric heat source 206, when the electric heat source 206 is in use; and a breaker or fuse device 212 that facilitates quick disconnection of the high voltage link between the shore power source 214 and the controller 202 in the event of a power surge and/or in the event an unusually high operating temperature is realized at the breaker or fuse device 212.

In operation, when a heat source selection has been made at or by the switch device 208 (e.g., via manual or an automatic selection), the controller 202 turns OFF one heat source (e.g., the gas furnace 204) and subsequently turns ON the other heat source (e.g., the electric heat source 206). The controller 202 may allow/facilitate the fan 204 operating at one of multiple available fan speeds. In an embodiment, these alternate fan speeds may be selected in order to circulate air more rapidly throughout a mobile residence 100 and/or in order to distribute heated air more efficiently throughout the confined area(s) of a mobile residence 100. In an embodiment, the controller 202 may receive input from the thermostat device 210 that allows it to make determinations as to what level of heat output may be required from a controlled heat source (e.g., an electric heat source 206). In an embodiment, the thermostat device 210 may control the gas furnace 204 directly via an internal circuit board at the gas furnace 204, while the controller 202 may use input from the thermostat device 210 to control the electric heat source 206.

FIG. 2B illustrates a modified block diagram depicting the major components of an adaptive heating system 220, including a resident electric heating element 226 therein, in accordance with an embodiment of the present invention. It should be understood that the adaptive heating system 220 is a simplified block diagram showing connectivity only between major system components. Other connections and system components could be added to the heating system 220 without departing from the spirit and scope of the present invention. In an embodiment, the adaptive heating system 220 includes at least the following components: a combined gas furnace/electric heat source unit 224 that has an internal fan 236 for circulating air through the gas furnace and across an resident electric heating element 226 that is part of the combined heat source unit 224; a controller 222 that is joined with the combined gas furnace/electric heat source unit 224, a switch device 228 that facilitates selection (this selection may be automatic or manual) of either the resident electric heating element 226 or the gas furnace component of the combined heat source unit 224 as a preferred heat source; a thermostat device 230 that can provide input to the controller 222 (e.g., indirectly via the switch device 228) to facilitate management of the heat output levels for either the electric heating element 226 or the gas furnace of the combined heat source unit 224 (depending on a heat source selection); a shore power source 234 (e.g., an external power supply) that can provide electric power to the controller 222, which can in turn provide power to the electric heating element 226, when in use; and a breaker or fuse device 232 that facilitates quick disconnection of the high voltage link between the shore power source 234 and the controller 222 in the event of a power surge and/or an unusually high operating temperature.

Similar to the operation of the adaptive heating system of FIG. 2A, when a heat source selection has been made at or by the switch device 228 (e.g., by a manual, an automatic, or a hybrid switch selection), the controller 222 turns OFF one heat source (e.g., the gas furnace) and subsequently turns ON the other heat source (e.g., the electric heating element 226). When operation of the electric heating element 226 is selected, the controller 222 can facilitate the fan's 236 operation at one of multiple available fan speeds. In an embodiment, the controller 222 may receive input from the thermostat device 230 that facilitates the controller's 222 determinations as to what level of heat output may be required from either heat source.

It should be understood that in both FIG. 2A and FIG. 2B, the respective heater fans 204 and 236 are capable of circulating air through the electric and the gas heat sources 206, 226, 204 and 224, while at the same time circulating air through a resident ventilation system (e.g., 112 of FIG. 1) of a particular mobile residence (e.g., 100 of FIG. 1).

Figure 3:
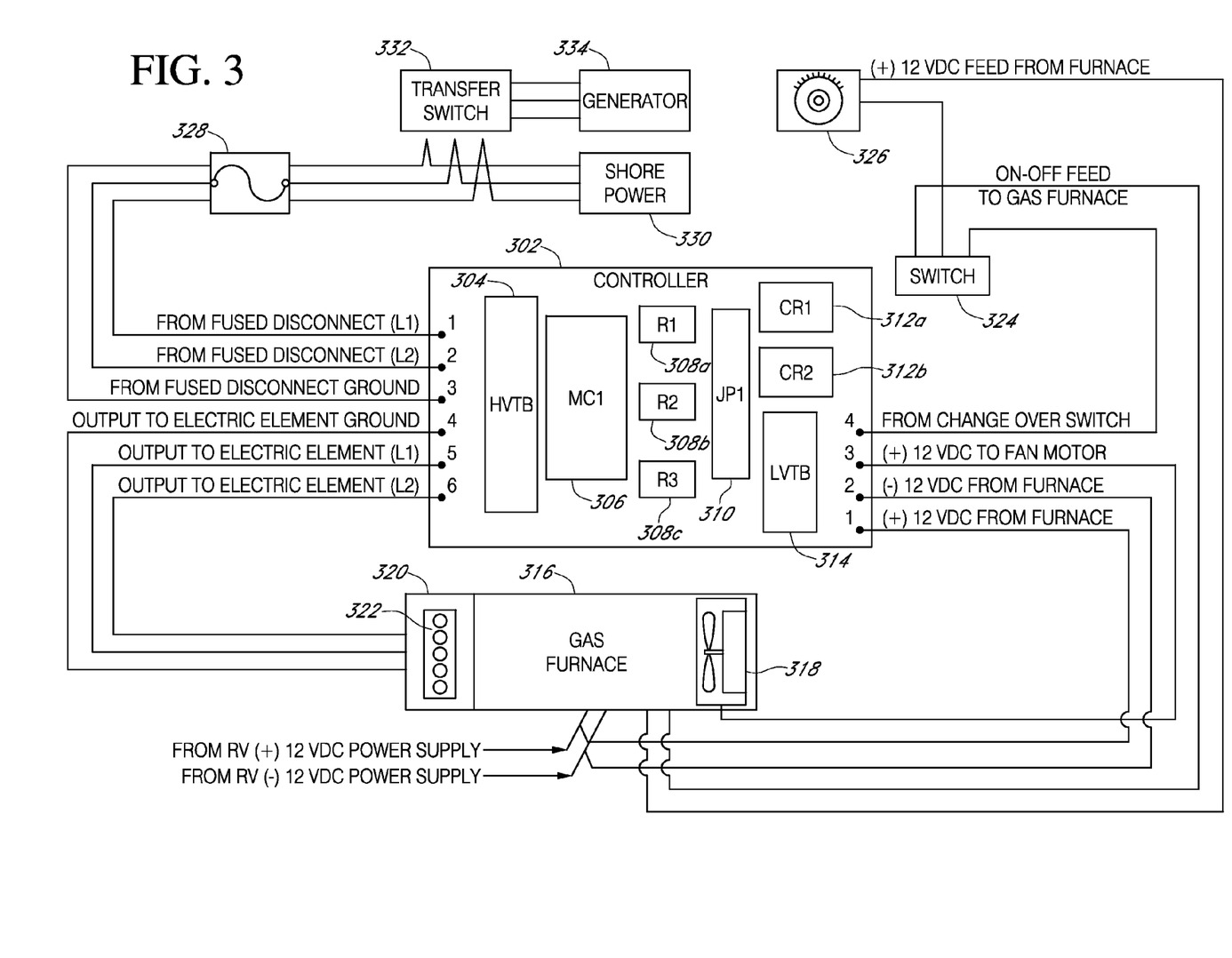
FIG. 3 illustrates a wireline diagram of an adaptive heating system, associated with the modified block diagram depicted in FIG. 2A, in accordance with an embodiment of the present invention.
Figure 4A:
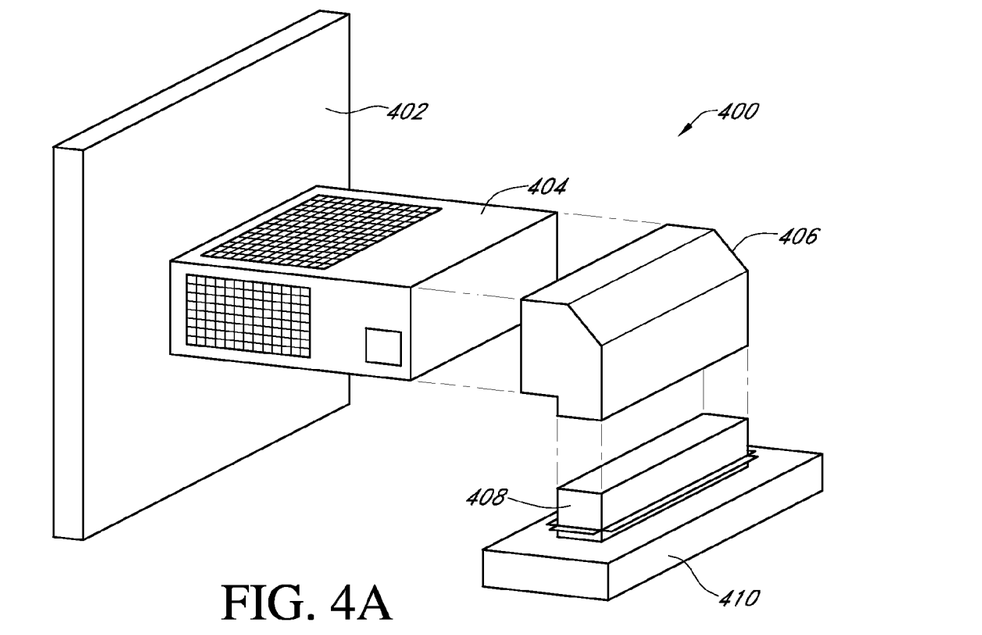
FIG. 4A illustrates an adaptive heating system with an add-on cabinet that is configured to be connected with a plenum ventilation system, in accordance with an embodiment of the present invention.

FIG. 3 illustrates a wireline diagram of an adaptive heating system, associated with the block diagram depicted in FIG. 2A, in accordance with an embodiment of the present invention. In an embodiment, the adaptive heating system includes at least the following major components: a controller 302; a gas furnace 316 with a heater fan 318; an electric heat source 320 with an electric heating element 322 (See e.g., FIGS. 6A-B); a switch device 324; a thermostat device 326; a shore power source 330; a breaker or fuse device 328; a transfer switch 332; and an auxiliary generator 334. As would be understood by those skilled in the art, the adaptive heating system depicted in FIG. 3 may operate in an electrical heat source mode, by utilizing and electrical power supply emanating from either a shore power source 330 or an auxiliary generator 334. In an embodiment, the transfer switch 332 may facilitate an electrical power source selection.

In an embodiment the adaptive heating system's components may be described as follows: the gas furnace 316 may be an existing component of the adaptive heating system (e.g., a part of a mobile residence's 100 existing heating and ventilation system). The furnace may be an optional heat source for a forced air heating system associated with the present invention. A couple well known manufacturers of gas furnaces for mobile residences are Atwood™ and Suburban Manufacturing™; the electric heat source 320 with an electric heater element 322 may also be referred to interchangeably herein as an "electric heater." The electric heater may be a added on to an existing gas furnace (See e.g., FIG. 2A) or it may be built directly into a gas furnace at the factory (See e.g., FIG. 2B), in any number of positional configurations, without departing from the spirit and scope of the present invention; the switch device 324 may be a manual single pole double throw (SPDT) ON/ON switch, an automatic switch, or a hybrid switch (discussed supra), that is used to switch the output from the thermostat 326, between the controller 302 and the gas furnace 316. The switch can be utilized to turn either heat source 322 or 316 ON or OFF utilizing the controller 302 (depending on a current operating state); the thermostat device 326 may be a preexisting device in a mobile residence's 100 heating and ventilation system, which can be used to automatically control the temperature in a confined area by turning the heating system and/or an auxiliary air-conditioning system ON or OFF, in response to a heat source selection input; the shore power source 338 is an electrical power supply that may be available to a mobile residence 100 by an electric utility provider; the breaker or fuse device 328 is a disconnect that may be a current limiting device that is installed between a power source (e.g., the shore power 330 or the generator 334) and the controller 302, in order to protect the high voltage wiring in the presence of an overload condition, such as a power surge; and the transfer switch 332 is an optional component that may be used to switch the power source of a mobile residence 100 between a shore power source 330 and an auxiliary generator 334. The generator 334 is a backup power source that is not generally used to supply power to the adaptive heating system of the present invention.

In an embodiment, the controller 302 includes at least the following components: a high-voltage terminal block 304 (HVTB); a high voltage contactor 306 (MC1); three resistive loads 308a-c (R1, R2, and R3); a jumper component 310 (JP1); two relays 312a-b (CR1 and CR2); and a low-voltage terminal block 314 (LVTB).

The controller 302, will be defined by the function of its components, as follows: the high-voltage terminal block 304 (HVTB) acts as the point of connection for the 120/240 VAC wiring and components that are attached to the controller, as depicted in FIG. 3; the high voltage contactor 306 (MC1) may be a high voltage, 30 amp, normally open (NO) double pole single throw (DPST) contactor used to turn power ON or OFF for the electric heating element 322. MC1 306 is controlled by CR2 312b, which is itself controlled by input from the thermostat device 326 when the switch device 324 is in the electric heater position (12 VDC coil, 30 amp, 120/240 volt contacts); the resistive loads 308a-c (R1, R2, and R3) are used in various combinations to reduce the voltage of the fan 318 via the jumper component(s) 310; the jumper component(s) 310 (JP1) may be used to control the speed of the fan 318 in the gas furnace when the switch device 324 is in the electric heater position. In an embodiment, there are multiple jumpers included in JP1 310 that allow power to flow through one or all the resistive loads R1, R2, and R3 308a-c to achieve a desired fan speed during operation of the electric heater 322; the first relay 312a (CR1) is a normally open (NO) single pole single throw (SPST) relay used to turn the furnace fan 318 ON or OFF. CR1 is controlled by the thermostat device 326 when the switch device 324 is in the electric heater mode (12 VDC coil, 20 amp, 12 VDC contacts); the second relay 312b (CR2) is a normally open (NO) single pole single throw (SPST) relay, which is used to isolate the 12 VDC from the 120/240 VAC, and to turn MC1 306 ON or OFF. CR2 312b is controlled by the thermostat device 326 when the switch device 324 is in the electric heater mode (12 VDC coil, 5 amp, 12 VDC contacts); and the low-voltage terminal block 314 (LVTB) acts as the point of connection for 12 VDC wiring and components that are attached to the controller 302, as depicted in FIG. 3.

In an embodiment, the wiring depicted in FIG. 3 may be collectively referred to herein as a "wireline system." This wireline system includes both a high voltage AC component emanating from the shore power source 330 or the generator 334, connecting with the HVTB 304, and emanating from the HVTB 304 to the electric heat source 320, comprising the electric heating element 322. The wireline system also includes a low voltage DC component emanating from a mobile residence's (e.g., 100 of FIG. 1) 12 VDC power supply, connecting with the gas furnace 316, and emanating from the furnace to the LVTB 314. The high voltage AC and low voltage DC components of the wireline system are labeled in FIG. 3 to facilitate easier understanding by those skilled in the Art.

FIG. 4A illustrates an adaptive heating system 400 with an add-on heater cabinet 406 that is configured to be connected with a plenum ventilation system 410. In an embodiment of the present invention, a gas furnace 404 for a mobile residence (e.g., 100 of FIG. 1) is shown connected to a wall 402 of the mobile residence. The gas furnace 404 includes exterior ventilation (not shown) that allows the furnace to expel gas combustion byproducts to the exterior of the mobile residence, when the furnace is in operation. The furnace 404 also includes interior intake ventilation (depicted as the vent grills on the sides and top of the furnace) that allows the furnace to take in oxygen-rich air to facilitate the gas combustion, while heating a confined area of a mobile residence.

In an embodiment, the add-on heater cabinet 406 may be joined with the heated air output side of the gas furnace 404 (the side where the furnace's fan expels heated air), as well as the plenum based ventilation system 410, by a plenum ventilation connector 408 that securely joins the add-on cabinet 406 to the existing ventilation system 410 of a mobile residence (e.g., 100 of FIG. 1). In this configuration, air heated by the gas furnace 404 is circulated from the furnace 404, through the add-on heater cabinet 406 (comprising an electric heating element) and the plenum based ventilation system 410 that includes multiple ventilation registers (not shown).

Figure 4B:
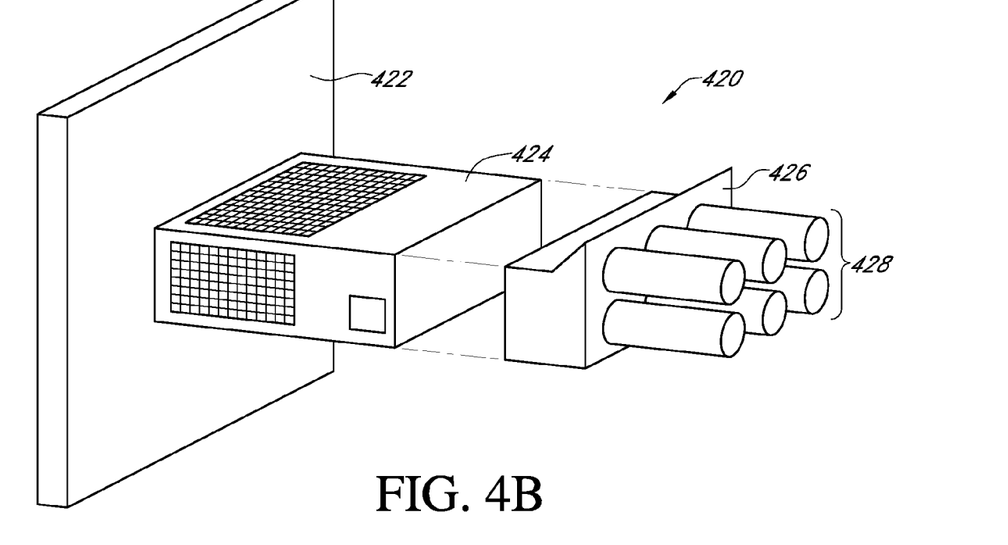
FIG. 4B illustrates an adaptive heating system with an add-on cabinet that is configured to be connected with a ducted ventilation system, in accordance with an embodiment of the present invention.

FIG. 4B illustrates an adaptive heating system 420 with an add-on cabinet 424 that is configured to be connected with a ducted ventilation system 428. In an embodiment of the present invention, a gas furnace 424 is shown connected to the wall 422 of a mobile residence 100. The gas furnace 424 includes exterior ventilation (not shown), and interior intake ventilation (depicted as the vent grills on the sides and top of the furnace).

In an embodiment, the add-on heater cabinet 426 may be joined with the heated air output side of the gas furnace 424 (the side where the furnace's fan expels heated air), as well as the ducted ventilation system 428 of a mobile residence (e.g., 100 of FIG. 1), via a manifold ventilation connector of the add-on heater cabinet (not shown). In this configuration, air heated by the gas furnace 424 can be circulated from the furnace 424, through the heater cabinet 426 (comprising an electric heating element) and the ducted based ventilation system 428 that includes multiple ventilation registers (not shown).

Figure 5:
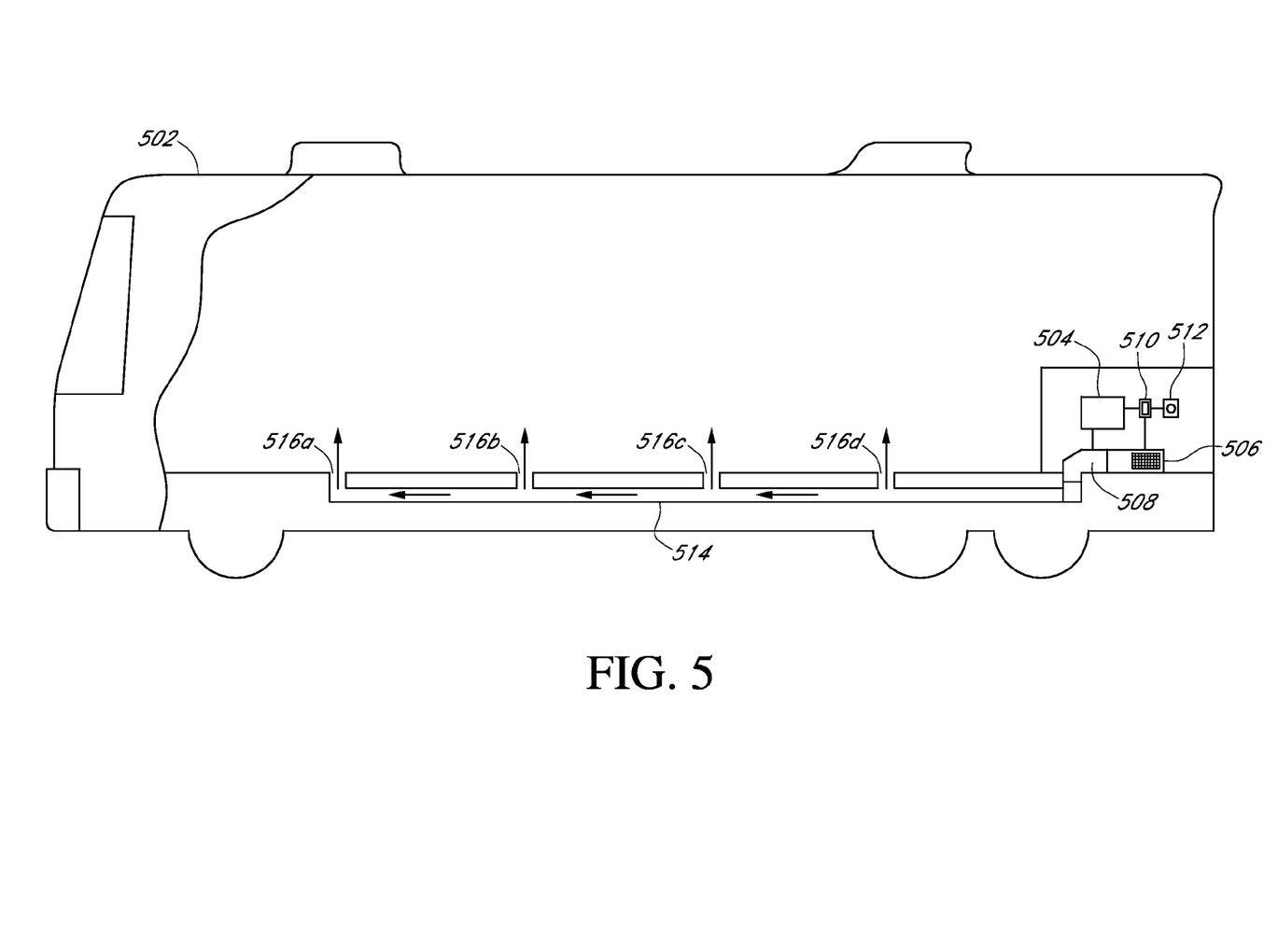
FIG. 5 illustrates an air-flow diagram that depicts the source and flow of heated air throughout the confined areas of a mobile residence, in accordance with an embodiment of the present invention.

FIG. 5 illustrates an air-flow diagram that depicts the source and flow of heated air throughout the confined areas of a mobile residence 502. In an embodiment, an inhabitant of the mobile residence 502 may selects either a gas furnace 506 or an electric heat source 508 as a preferred heat source, utilizing a switch device 510 that may be mounted on an interior wall of the mobile residence 502. Alternately, the switch device 510 may be an automatic or a hybrid switch device (discussed supra). It is contemplated within the scope of the present invention that the switch device could be part of the controller 504 or part of a single hybrid heater unit (e.g., a gas/electric heater unit with an onboard controller). This consolidated design would be particularly practical where the switch device 510 was an automatic switch having logic circuitry that facilitates heat source selections, in accordance with various detected system conditions (discussed supra), as opposed to a manual switch that requires user input.

Whether the electric heat source 508 or the gas furnace 506 was selected as a preferred heat source, the designated temperature set at the thermostat device 512 would facilitate determinations as to what level of heat would need to be output by the selected heat source and/or for how long the designated heat source should operate. In the electric heat source mode, the controller 504 would be capable of adjusting the heater fan (not shown) within the gas furnace 506 and the operating power of the electric heater element within the electric heat source 508, in order to output the right amount of heat and air flow to efficiently adjust the temperature within the confined area(s) of the mobile residence 502, until a stable, desired room temperature was achieved.

In an embodiment, the fan within the gas furnace 506 would be capable of forcing air through the activated gas furnace 506 or through the activated electric heat source 504 at a rate sufficient to properly heat the air inside the operating heat source before circulating the heated air through the backbone of the ventilation system 514 (e.g., a plenum or a ducted ventilation backbone) and out into the confined living areas of the mobile residence 502 via any number of distributed ventilation ducts and/or ventilation registers 516*a-d*. Generally, when the air temperature within the confined area(s) of the mobile residence achieved a temperature associated with a set room temperature of the thermostat device 512, the selected operating heat source would be powered down (partially or completely) to reduce a heat source output to a stable temperature.

Figure 6A:
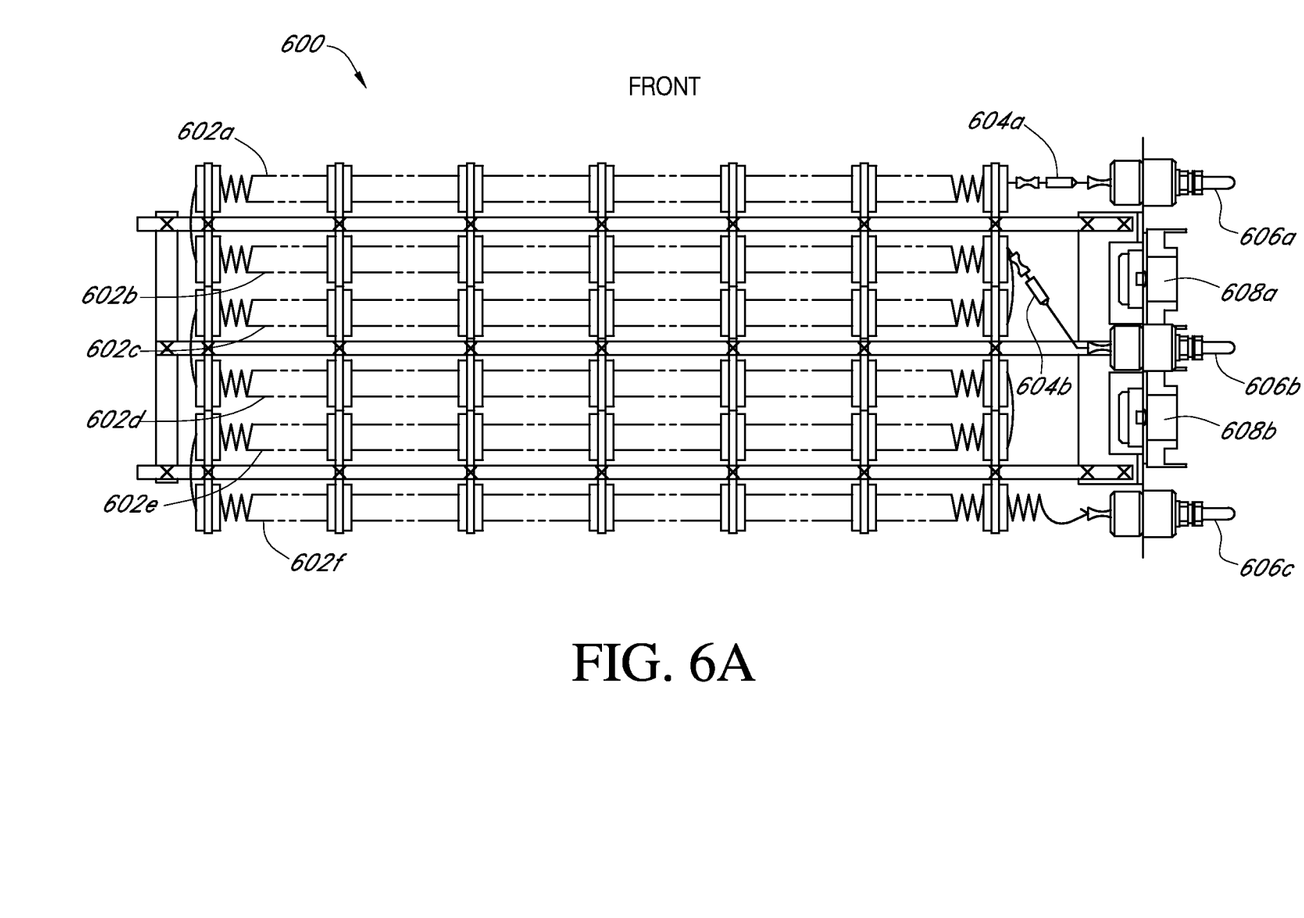
FIG. 6A illustrates the front side view of an electric heater element capable of operating at multiple power output levels, in accordance with an embodiment of the present invention.
Figure 6B:
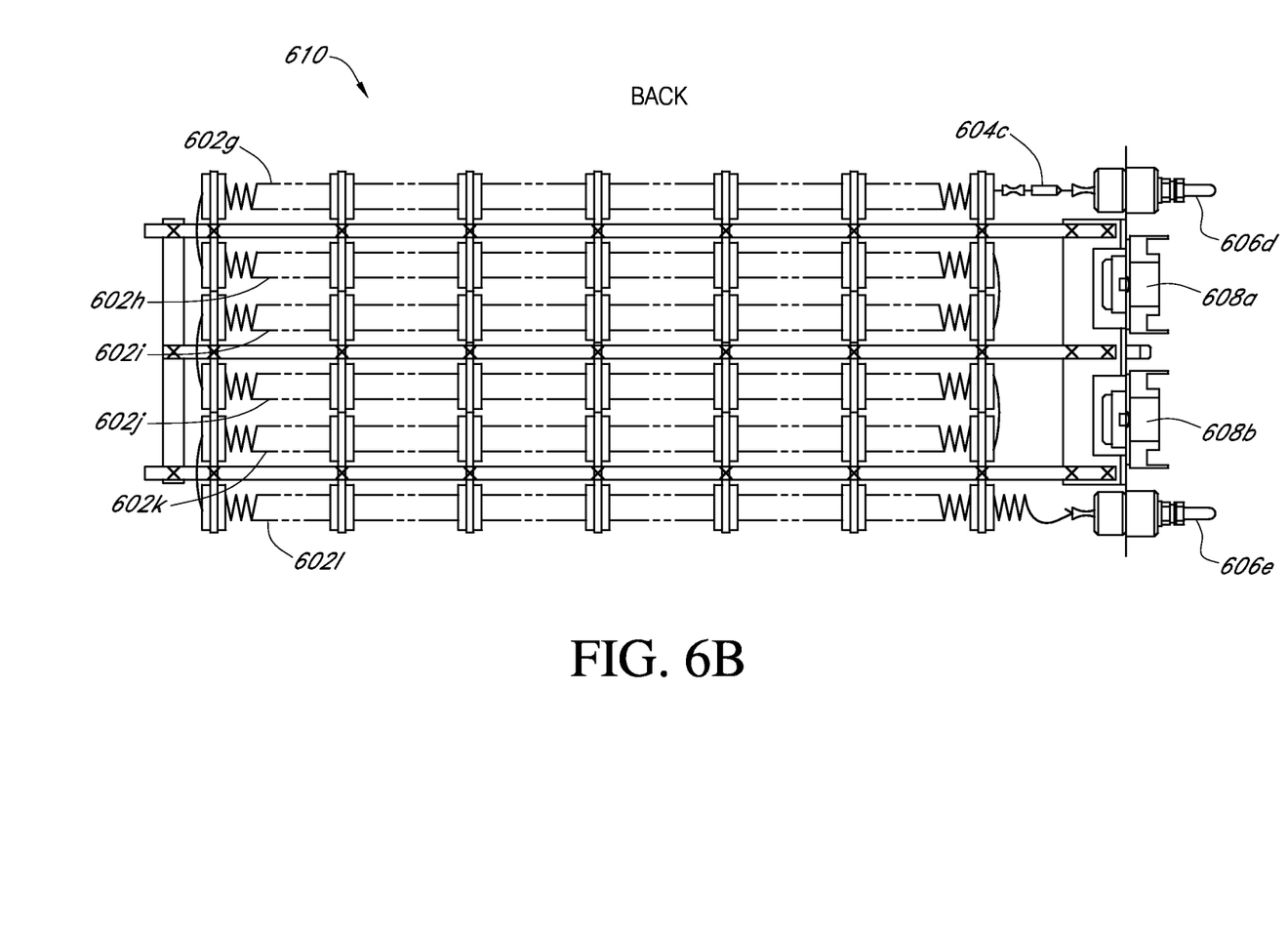
FIG. 6B illustrates the back side view of the electric heater element of FIG. 6A, capable of operating at multiple power output levels, in accordance with an embodiment of the present invention.

FIG. 6A illustrates the front side view of an electric heater element 600 capable of operating at multiple power output levels, which facilitates the output of multiple levels of heat. FIG. 6B illustrates the back side view of an electric heater element 610 that is the same heater element depicted in the front side view 600 of FIG. 6A. In an embodiment, the heater element 600 and 610 of FIGS. 6A-B is capable of operating at a total of 7 different heating power outputs.

These variable electric heater element outputs are listed in Table 1 below:

TABLE 1

| High Voltage AC Electric Heater Input | Electric Heater Output Watts/BTU's |
| --- | --- |
| 120 VAC | 684 Watts/2335 BTU's per hour |
| 120 VAC | 762 Watts/2603 BTU's per hour |
| 120 VAC | 937 Watts/3200 BTU's per hour |
| 120 VAC | 1250 Watts/4267 BTU's per hour |
| 120 VAC | 1800 Watts/6145 BTU's per hour |
| 240 VAC | 3750 Watts/12800 BTU's per hour |
| 240 VAC | 5000 Watts/17070 BTU's per hour |

It should be understood that the electric heater element 600 and 610, depicted in FIGS. 6A-B, could be configured to operate at other variable power/heat outputs (e.g., at other Electric Heater Output ratings than those listed in Table 1), without departing from the spirit and scope of the present invention.

In an embodiment, the electric heater element 600 and 610 includes at least the following components: multiple heater coils 602*a-l*, multiple fusible links 604*a-c*, multiple power terminals 606*a-e*, and multiple insulator terminals 608*a-b*. The electric heater element 600 and 610 will be defined by the function of its primary components. The heater coils 602*a-l* may be open wire coils (e.g., composed of a ⅜ inch diameter coil) that are made of a wire type (e.g., Nicrome wire) with specific resistance ratings (measured in Ohms) to facilitate a variable heat/thermal power output. In an embodiment, different sets of the wire coils 602*a*-1 may be configured to facilitate the heater element 600 and 610 having different heat outputs. For example, a first set of coils may have 8 Ohms of resistance that can produce a heat output of 6145 BTUs per hour (on the 120 VAC side), while a second set of coils may have 11.3 Ohms of resistance that can produce a heat output of 17070 BTUs per hour (on the 240 VAC side). A third set of coils may have 3.8 Ohms of resistance, and when placed in series with the 11.3 Ohm set of coils, the combined coils can produce a heat output of 12803 BTUs per hour (on the 240 VAC side). As noted in Table 1, the associated power outputs facilitated by these particular combinations would be 1800 Watts (associated with the heat output of 6145 BTU's per hour), 3750 Watts (associated with the heat output of 12800 BTU's per hour), and 5000 Watts (associated with the heat output of 17070 BTU's per hour).

The multiple fusible links 604*a-c*, are failsafe devices that are designed to melt at a particular operating temperature (e.g., 350 degrees Fahrenheit) to stop the flow of current to the electric heater element's 600 and 610 components (e.g., the heater coils 602*a-l*) when too hot of an operating temperature could result in a fire hazard. The multiple power terminals 606*a-e* are adapted to be connected with an external electrical power supply (e.g., a high voltage power supply coming from a controller device 302 and emanating from a shore power source 330) and they are configured to facilitate a particular output power when various combinations of the multiple heater coils 602*a-l* are used to heat a confined area. In one embodiment, the power output of the heater element 600 and 610 would be 3750 Watts when terminals 606*a* and 606*c* were connected to a 240 VAC power supply. In an embodiment, the power output of the heater element 600 and 610 would be 5000 Watts when terminals 606*b* and 606*c* were connected to a 240 VAC power supply. In an embodiment, the power output of the heater element 600 and 610 would be 1800 Watts when terminals 606*d* and 606*e* were connected to a 120 VAC power supply. The multiple insulator terminals 608*a-b* (e.g., porcelain insulator terminals) are high temperature electric insulators that may be used to support the high voltage power input's connection with the multiple heater coils 602*a-l*. It should be understood that the above listing of electric heater element 600 and 610 components is not a complete listing of parts for the electric heater element. As would be understood by those skilled in the Art, only primary components of the heater element have been described herein. Accordingly, there may be other component parts to the heater element that support/facilitate its functionality.

While several embodiments of the present invention have been illustrated and described herein, many changes can be made without departing from the spirit and scope of the invention. Accordingly, the scope of the invention is not limited by any disclosed embodiment. Instead, the scope of the invention should be determined from the appended claims that follow.

The embodiments of the invention in which an exclusive property or privilege is claimed are defined as follows:

1. An adaptive heating system for optimizing energy resources while heating a confined living area within a recreational vehicle (RV), the adaptive heating system comprising:
    a controller;
    a first heat source;
    a second heat source;
    a switch device configured to select only one of the first heat source or the second heat source at a time; and
    a wireline system connecting the controller to the first heat source, the second heat source, and the switch device,
    wherein the controller is configured to:
        receive an input selection from the switch device;
        determine whether to operate the first heat source or the second heat source based on the received input selection; and
        in response to the determination, initiate operation of either the first heat source or the second heat source to heat the confined living area within the RV,
        wherein the first heat source and the second heat source are each configured to heat air in a forced-air heating arrangement within a combined physical structure that is connected to a heating and ventilation system of the RV, and
        wherein the combined physical structure comprises both the first heat source and the second heat source.

2. The adaptive heating system of claim 1, wherein the second heat source is a gas furnace that operates when the second heat source is not selected at the switch device.

3. The adaptive heating system of claim 1, wherein:
    the second heat source is an electric heater comprising an electric heating element that is exposed to air within the RV; and
    the electric heater operates when the first heat source is not selected at the switch device.

4. The adaptive heating system of claim 1, wherein:
    the first heat source or the second heat source comprises a manifold connector that connects the first heat source or the second heat source to a ducted heating and ventilation system; and
    the ducted heating and ventilation system is configured to circulate heated air emanating from the first heat source and heated air emanating from the second heat source within the RV.

5. The adaptive heating system of claim 1, wherein:
    the first heat source or the second heat source comprises a plenum connector that connects the first heat source or the second heat source to a plenum heating and ventilation system; and
    the plenum heating and ventilation system is configured to circulate heated air emanating from the first heat source and heated air emanating from the second heat source within the RV.

6. The adaptive heating system of claim 1, wherein:
    the controller is further connected to a thermostat device via the wireline system; and
    the thermostat device facilitates temperature control for both the first heat source and the second heat source within the RV.

7. The adaptive heating system of claim 1, wherein the controller is further connected to a shore power source, such that the second heat source is configured to operate using an external power supply that is not a resident component of the adaptive heating system within the RV.

8. The adaptive heating system of claim 1, wherein the controller is further configured to control an electric fan associated with the first heat source to circulate air across an electric heating element of the second heat source.

9. An adaptive heating system for heating a confined living area within a recreational vehicle (RV), the adaptive heating system comprising:
    a controller;
    an add-on heater cabinet with an electric heat source, wherein the add-on heater cabinet is configured to be joined with a resident heat source of the RV;
    a switch device configured to select only one of the electric heat source of the add-on heater cabinet or the resident heat source of the RV at a time; and
    a wireline system connecting the controller to the electric heat source of the add-on heater cabinet, the resident heat source of the RV, and the switch device,
    wherein the controller is configured to initiate operation of the electric heat source of the add-on heater cabinet or the resident heat source of the RV as a preferred heat source to heat the confined living area within the RV, based on a selection received from the switch device, and
    wherein the electric heat source of the add-on heater cabinet and the resident heat source of the RV are each configured to heat air in a forced-air heating arrangement within a combined physical structure that is connectable to a heating and ventilation system of the RV.

10. The adaptive heating system of claim 9, wherein the resident heat source is a gas furnace.

11. The adaptive heating system of claim 9, wherein the add-on heater cabinet comprises a specialized connector that connects the add-on heater cabinet to the heating and ventilation system of the RV.

12. The adaptive heating system of claim 9, wherein:
    the controller is further connected to a thermostat device via the wireline system; and
    the thermostat device facilitates temperature control for both the resident heat source of the RV and the electric heat source of the add-on heater cabinet.

13. The adaptive heating system of claim 9, wherein the controller is further connected to a shore power source that is peripheral to the RV, such that the electric heater source of the add-on heater cabinet can operate using an external power supply.

14. The adaptive heating system of claim 9, wherein the controller is further configured to control an electric fan associated with the resident heat source of the RV to circulate air through the add-on heater cabinet.

15. The adaptive heating system of claim 14, wherein the air circulated through the add-on heater cabinet is heated by the electric heat unit of the add-on heater cabinet-when the controller designates the electric heat unit to heat the the RV, as opposed to the resident heat source.

16. A heat source controller for selectively designating the operation of dissimilar heat sources to heat the same confined living area within a recreational vehicle (RV) at different times, the heat source controller comprising:
- a high voltage component adapted to receive power from a shore power source and to supply power to an electric heat source within the RV;
- a low voltage component adapted to receive a heat source selection input and to control operation of an electric heater fan;
- wherein the heat source controller is configured to:
  - receive a heat source selection input from a switch device;
  - determine whether the heat source selection input indicates a selection of the electric heat source or a selection of a second heat source, wherein only one of the electric heat source and the second heat source is operable at a time; and
  - in response to the determination, initiate operation of either the electric heat source or the second heat source to heat the confined living area within the RV,
- wherein the electric heat source and the second heat source are each configured to heat air in a forced-air heating arrangement within a combined housing that is connected to a heating and ventilation system of an RV, and
- wherein the combined housing comprises the first heat source, the second heat source, and the heat source controller.

17. The heat source controller of claim 16, wherein the second recreational vehicle heat source is a gas furnace.

18. The heat source controller of claim 17, wherein the heat source controller is further configured to receive input from a thermostat device that facilitates temperature control for both the electric heat source and the gas furnace, at different times.

19. The heat source controller of claim 17, wherein the heat source controller is further configured to control the electric heater fan to circulate air though the electric heat unit during an electric heating operation, when the gas furnace is not in operation.

20. The heat source controller of claim 17, wherein the heat source controller is further configured to control the electric heater fan to circulate air through the gas furnace during a gas heating operation, when the electric heat unit is not in operation.

* * * * *